Feb. 1, 1927. 1,616,373
G. M. KENDALL
DRAIN COCK FOR AUTOMOBILE RADIATORS
Filed May 6, 1926
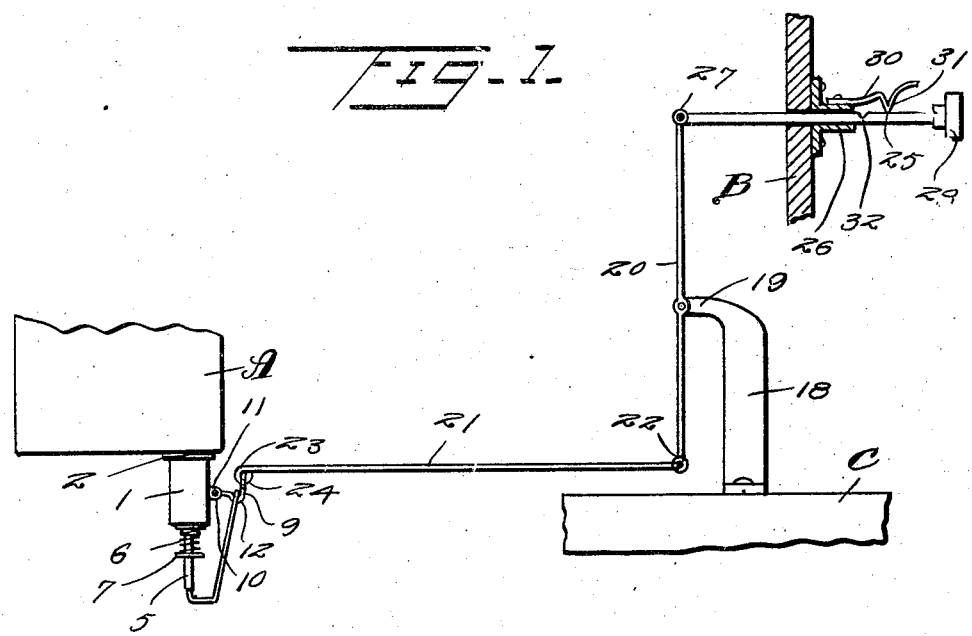
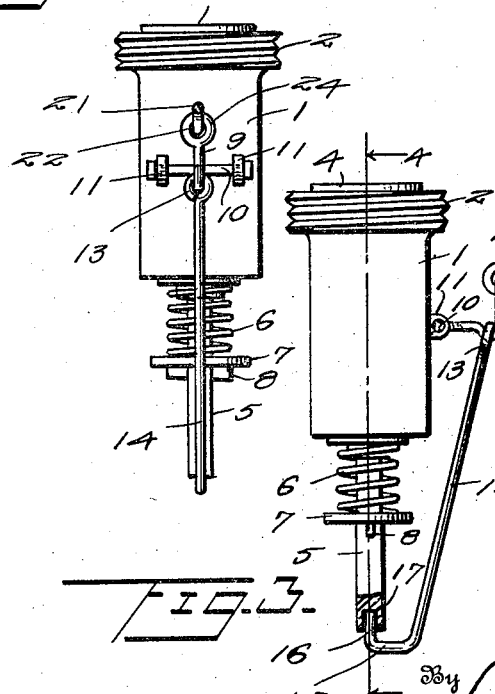
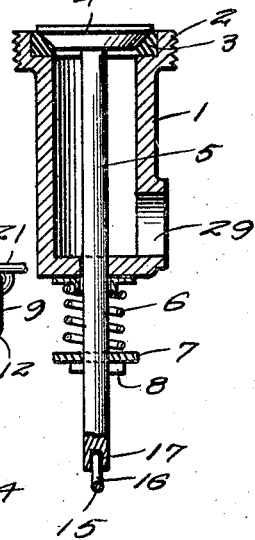
Inventor
G. M. Kendall Patented Feb. 1, 1927.

1,616,373

UNITED STATES PATENT OFFICE.

GEORGE M. KENDALL, OF WEATHERFORD, TEXAS, ASSIGNOR OF ONE-HALF TO W. G. COCKERELL, OF WEATHERFORD, TEXAS.

DRAIN COCK FOR AUTOMOBILE RADIATORS.

Application filed May 6, 1926. Serial No. 107,173.

The invention relates to draining means for radiators of automobiles, and has for its object the provision of means by which the draining of the water from automobile radiators may be relieved of its unpleasantness, usually necessitating getting under the car to reach the drain cock by providing a drain cock in which the valve is held normally closed by means of a spring, and providing means operated from the dash-board of the automobile for opening the valve against the resistance of the spring and maintaining it in an open position while the radiator is being drained.

The invention will be described in detail hereinafter and will be found illustrated in the accompanying drawings in which Figure 1 is a view of the improved radiator draining means showing it applied to the automobile and radiator, shown fragmentarily, Figure 2 is a rear view of the drain cock, Figure 3 is a side view, and Figure 4 is a vertical sectional view substantially on a plane indicated by the line 4—4 of Figure 3.

In the drawings similar reference characters will be used to designate corresponding parts throughout the several views.

In the drawings a radiator is indicated at A, dash-board of the automobile is indicated at B, and a fragment of the frame of the automobile is designated C. A drain cock is provided for the radiator A comprising a casing 1 having screw threads 2 adapted to be secured in the bottom of the radiator A and having a valve seat 3 to receive a valve 4 on valve stem 5 slidably mounted in the casing 1, said valve being held normally to its seat by means of an expansible coil spring 6 enclosing the valve stem 5 and bearing against the bottom of the casing 1 and a disk washer 7 held in position by means of a pin 8 engaging the stem 5. 9 indicates an angular arm secured to a shaft 10, journaled in ears 11 on the rear side of the valve casing 1, and formed with a recessed portion 12 to receive an eyelet 13 on rod 14. The lower end of rod 14 is provided with an offset portion 15 and an upstanding end 16 that seats in a recess 17 in the lower end of the valve stem 5.

A supporting member 18 is carried by the frame C and has an offset end 19 on which is fulcrumed a lever 20. 21 indicates a rod pivotally secured to one end of lever 20 as shown at 22, while its other end is provided with an eyelet 23 that engages in eyelet 24 on the arm 9. A rod 25 is slidably mounted in a bearing 26, secured to the dash-board B and through the dash-board, and is pivotally connected as shown at 27 to the other end of the lever 20, and has a knob 28 thereon to be grasped for operating the rod.

It will be understood that when the rod 25 is actuated in a direction toward the right in Figure 1 the arm 9 will be swung on the shaft 10 in a direction upwardly and toward the casing 1 thus pulling upwardly on the rod 14 and through the engagement of the upturned end 16 with the lower end of the valve stem 5 the valve 4 will be lifted from its seat and thus permit water to escape from the radiator A to the casing 1 and the offset opening 29. To hold the valve 4 in open position a spring dog 30 is provided having a pointed extension 31 adapted to seat in notch 32.

What is claimed is:—

A drain cock for automobile radiators, comprising a casing adapted to be secured in the bottom of a radiator, a valve stem slidably mounted in said casing and having a valve thereon seated in the casing, a spring engaging said stem to normally seat the valve, an arm pivotally engaging the casing, a rod pivotally engaging the arm and engaging the valve stem, a rod adapted to be slidably mounted in the dash-board of an automobile, a lever suitably fulcrumed and connected to said second named rod, and another rod connecting the lever and the arm.

In testimony whereof I affix my signature.

GEORGE M. KENDALL.